United States Patent

[11] 3,617,523

| [72] | Inventor | Burwell Spurlock<br>Lafeyette, Calif. |
|---|---|---|
| [21] | Appl. No. | 867,068 |
| [22] | Filed | Oct. 16, 1969 |
| [45] | Patented | Nov. 2, 1971 |
| [73] | Assignee | Chevron Research Company<br>San Francisco, Calif. |

[54] REGENERATION PROCEDURE FOR SULFUR-CONTAMINATED HYDROCONVERSION UNIT
9 Claims, No Drawings

[52] U.S. Cl. ..................................... 208/140,
208/59, 208/65, 252/416, 252/419
[51] Int. Cl. ....................................... B01j 11/04
[50] Field of Search ............................... 208/140,
65, 59; 252/416, 419

[56] References Cited
UNITED STATES PATENTS

| 2,892,770 | 6/1959 | Coley et al. | 208/140 |
| 2,923,679 | 2/1960 | Thomson | 252/416 |
| 2,943,999 | 7/1960 | Moore et al. | 208/140 |
| 3,137,646 | 6/1964 | Capsuto | 208/140 |
| 3,481,861 | 2/1969 | Hayes | 208/140 |
| 3,496,096 | 2/1970 | Kluksdahl | 208/140 |

*Primary Examiner*—Herbert Levine
*Attorneys*—A. L. Snow, F. E. Johnston, G. F. Magdeburger, C. J. Tonkin and Dix A. Newell ABSTRACT: A platinum group component catalyst, used in a hydroconversion unit comprising a plurality of reactors in series, is regenerated to remove carbonaceous matter from the catalyst without contaminating the catalyst with sulfur compounds by purging the hydroconversion unit of hydrocarbons, circulating an inert gas through the hydroconversion unit at a pressure of from 50 to 1000 p.s.i.g., controlling the inlet temperature in all but the terminal reactor to below about 500° F. while controlling the inlet temperature in the terminal reactor at from 500° to 700° F., then introducing an oxygen-containing gas into the terminal reactor to remove carbonaceous matter from the catalyst but insuring that the oxygen is discontinued when the exit stream from the terminal reactor contains more than about 0.1 volume percent oxygen.

REGENERATION PROCEDURE FOR SULFUR-CONTAMINATED HYDROCONVERSION UNIT

BACKGROUND OF THE INVENTION

1. Field

The present invention is directed to a regeneration procedure for a platinum group component catalyst. Moreover, the present invention is directed to the regeneration of a platinum group component catalyst having carbonaceous matter accumulated thereon and wherein the hydroconversion system in which the catalyst is used has become contaminated with sulfur compounds.

2. Prior Art

A catalyst comprising a platinum group component in association with a porous inorganic oxide carrier finds use in a wide variety of hydroconversion processes. Thus, platinum group component catalysts find use for isomerization, dehydrogenation hydrogenation, hydrocracking, reforming, alkylation, etc. In general, the hydroconversion processes involve the use of a plurality of reactors in series. In some processes, the reactors are preceded by a heating zone, e.g., a furnace, heat exchanger, etc. Thus, for example, in the reforming of a naphtha fraction, the naphtha is passed to a plurality of reaction zones or reactors in series, each reactor containing a catalyst comprising a platinum group component in association with a porous inorganic oxide carrier. Platinum on alumina is a principal catalyst for reforming. The naphtha to be reformed is contacted in a first reaction zone with the platinum group component catalyst under reaction conditions to convert principally naphthenes to aromatics. While the dehydrogenation of naphthenes is the principal reaction, other reactions may occur to a minor extent, e.g., isomerization of methylcyclopentane, isomerization of paraffins, hydrocracking, etc. Inasmuch as the principal reaction in the first zone is endothermic, the effluent from the first reaction zone will be at a temperature generally lower than that of the feed. Hence, the effluent from the first reaction zone must be heated to the desired inlet temperature prior to introduction to the second reaction zone. The effluent from the second and each subsequent reactor is reheated prior to being passed to another reactor. In the last reaction zone, the principal reactions are the dehydrocyclization of paraffins to produce aromatics in the feed and the hydrocracking of high boiling components.

In the hydroconversion process the platinum group component catalyst after prolonged hydroconversion becomes deactivated principally from the accumulation of carbonaceous deposits thereon. With the loss in activity of the catalyst, the efficiency of conversion decreases significantly. For example, in reforming as the catalyst deactivates, the temperature must be increased to maintain conversion at the desired level; but even with the increase in temperature, the yield of valuable $C_5+$ gasoline products decreases. Thus, periodically in a hydroconversion process, e.g., a reforming process, it is necessary to regenerate the catalyst to remove carbonaceous deposits and to substantially restore the activity of the catalyst to that of fresh catalyst.

One of the problems involved in regeneration of a platinum group component catalyst is that of sulfur compounds which have contaminated the hydroconversion unit, i.e., the reactors, the heating zones, and other vessels, lines, etc. Sulfur is a severe contaminant of the hydroconversion unit apparatus and is held very strongly. In particular, the walls of the furnace tubes and heat exchanger tubes are very susceptible to sulfur contamination. The sulfur probably exists as metal sulfides, etc., iron sulfides. The presence of sulfur during the regeneration can create severe problems. Thus, regeneration in an oxygen-containing atmosphere will oxidize the sulfur contaminating the unit to sulfur oxides, e.g., the sulfites and/or sulfates, which when transported to the platinum group component catalyst becomes strongly held by the catalyst. The sulfur oxides are probably adsorbed onto the porous solid carrier, e.g., alumina. In fact the sulfur oxides may not necessarily be removed from the platinum group component catalyst under even severe regeneration steps. An inferior regeneration results when the catalyst is contaminated with sulfur oxides, i.e., the catalyst is not restored to high activity.

SUMMARY OF THE INVENTION

It has now been found that a hydroconversion unit having a plurality of reactors in series, each reactor containing a platinum group component catalyst, can be successfully involved in a regeneration wherein the platinum group component is subjected to an oxygen atmosphere to remove carbonaceous deposits and to restore activity to the catalyst without the adverse effects of contaminating the platinum group component catalyst with sulfur oxides during the regeneration. The regeneration procedure of the present invention involves carefully controlling the conditions of temperature, pressure, and oxygen content of the reaction zones.

Thus, the process of the present invention for regenerating a platinum group component catalyst contained in a hydroconversion unit comprising a plurality of reaction zones in series, preferably each reaction zone being preceded by a heating zone, and wherein the catalyst has become deactivated and has carbonaceous matter accumulated thereon and the hydroconversion unit has become contaminated with sulfur, involves the steps of:

1. Purging the hydroconversion unit of hydrocarbons;
2. circulating an inert gas through the hydroconversion unit at a pressure of from 50 to 1000 p.s.i.g.;
3. controlling the inlet temperature in all but the terminal reactor below about 500° F.;
4. controlling the inlet temperature in the terminal reactor at from 500° to 700° F.;
5. introducing an oxygen-containing gas into the terminal reactor in an amount such that the volume percent of oxygen to total circulating gases does not exceed about 2 and preferably does not exceed about 1, but in sufficient amount to remove carbonaceous matter from the catalyst;
6. discontinuing the introduction of oxygen-containing gas into the terminal reactor when the oxygen content of the gas exiting from the terminal reactor exceeds about 0.1 volume percent; and
7. then purging the hydroconversion unit of any oxygen and heating the catalyst in the reactors in the presence of hydrogen.

DESCRIPTION OF THE INVENTION

As indicated above the present invention is concerned with the regeneration of platinum group component catalysts contained in a hydroconversion unit which has become contaminated with sulfur. Generally, contamination with sulfur will occur primarily from the hydrocarbon feed. Thus, in any hydroconversion process, wherein the feed contains greater than about 10 p.p.m. sulfur, contamination of the hydroconversion unit can readily occur. Although contamination can occur when using feeds containing less than 10 p.p.m. sulfur, particularly when the process is conducted for prolonged periods of time, the present invention is generally concerned with those cases wherein the feed contains greater than 10 p.p.m. sulfur. In particular, the present invention is concerned with reforming processes wherein a large amount of sulfur has entered the system as, e.g., through the feed.

The sulfur which enters the hydroconversion unit will generally be organic sulfur or $H_2S$. While not all of the sulfur which enters the hydroconversion unit will contaminate the metal or iron walls of the hydroconversion unit apparatus, e.g., the heat exchangers and furnaces, etc., a substantial amount will remain and will not be purged from the hydroconversion unit during prolonged operation. The organic sulfur or $H_2S$ will not generally exist as such in the hydroconversion unit but will generally be associated with the walls, etc., of the hydroconversion unit as sulfides of iron or sulfides of the other metals present. In general, the platinum group component catalyst will not be contaminated with significant amounts of sulfur for prolonged periods of time unless a continuous source of sulfur is added to the hydroconversion unit. Organic sulfur which may enter the hydroconversion unit will generally be rapidly converted to $H_2S$; $H_2S$ is only weakly held by a platinum group component catalyst and will generally be removed from the catalyst during prolonged operation, particularly when only intermittent quantities of sulfur are added to the system.

Once sulfur has contaminated the system, any subsequent regeneration of the catalyst is subject to difficulty. Regeneration of the catalyst which normally occurs in the presence of an oxygen-containing gas can easily result in the oxidation of the sulfur from the iron walls, etc. The sulfur oxides can then be easily transported by the regeneration gases through the hydroconversion unit into contact with the platinum group component catalyst. Once the sulfur oxides have contacted the catalyst, they are very strongly held by the catalyst. Severe regeneration will not necessarily remove the sulfur oxides. These sulfur oxides lead to further contamination of the catalyst and further deactivation of the catalyst and result in an inferior regeneration of the catalyst. Thus, a subsequent hydroconversion process using a regenerated catalyst which has been contaminated with sulfur oxides during regeneration will not result in the conversion of hydrocarbons to the same level of efficiency as a fresh catalyst which has not been contaminated with sulfur oxides.

The difficulty inherent in regeneration of a platinum group component catalyst in a hydroconversion unit is particularly severe when the hydroconversion unit comprises a series of reactors, each reactor being preceded by a heating zone, e.g., a furnace, heat exchanger, etc. Furthermore, the regeneration procedure is complicated when the hydroconversion system has a recycle line from the terminal reactor to at least one of the prior reactors. Thus, during regeneration, the regeneration gases would normally be recirculated through the recycle line from the terminal reactor to the first or another reactor ahead of the terminal reactor. This would mean that the oxygen-containing gas would pass through the several heaters and through the several reactors, thereby leading to extreme oxidation of sulfur in the hydroconversion unit and subsequent transportation of the sulfur oxides into contact with the catalyst in the reactors. Thus, the present invention is primarily involved with the regeneration of a platinum group component catalyst in a hydroconversion unit comprising a plurality of reactors in series, each reactor being preceded by a heating zone, and wherein a recycle line is used during regeneration, as above explained.

The platinum group component catalyst which is involved in the regeneration process of the present invention will generally contain from 0.01 to 20 weight percent, preferably 0.01 to 10 weight percent, of a platinum group component in association with a porous inorganic oxide carrier. A platinum group component embraces all the members of Group VIII of the Periodic Table having an atomic weight greater than 100 as well as compounds and mixtures of any of these. Thus, the platinum group component includes compounds, metals or mixtures thereof. Platinum is the preferred component because of its high hydroconversion activity, particularly reforming activity. The preferred amount of platinum for reforming catalysts is from 0.01 to 3 weight percent, more preferably 0.1 to 2. Other platinum group component catalysts, e.g., palladium, iridium, ruthenium, rhodium, etc., are also important hydroconversion components for catalysts.

Porous inorganic oxide carriers which are part of the platinum group component catalyst will generally have surface areas of from 50 to 750 m.$^2$/gm. and preferably from 150 to 750 m.$^2$/gm. The carrier can be a natural or synthetically produced inorganic oxide or a combination of inorganic oxides. Typical acidic inorganic oxide supports which can be used are the naturally occurring aluminum silicates, particularly when acid treated to increase the activity, and the synthetically produced cracking supports such as silica-alumina, silica-zirconia, silica-alumina-zirconia, silica-magnesia, silica-alumina-magnesia, and crystalline zeolitic aluminosilicates as, for example, zeolite "X", "Y", "L", etc. The porous inorganic oxide carrier will, of course, vary, depending upon the particular hydroconversion process to which it will be subjected. Thus, for hydrocracking, the porous inorganic oxide carrier will generally be a siliceous oxide as, for example, silica-alumina. For reforming, the porous inorganic oxide carrier will normally have low cracking activity, i.e., have limited acidity. Thus, alumina or magnesia are preferred for reforming. Alumina finds greatest use for reforming catalysts, e.g., gamma alumina, eta alumina, etc. Many methods are available for preparing alumina. Thus, the alumina can be prepared by adding a suitable alkaline agent, such as ammonium hydroxide, to a salt of alumina, such as aluminum chloride, aluminum nitrate, etc., in an amount to from aluminum hydroxide which on drying and calcining is converted to alumina. Alumina may also be prepared by the reaction of sodium aluminate with a suitable agent to cause precipitation thereof with the resulting formation of aluminum hydroxide gel.

Other components in addition to the platinum group component can be present with the porous inorganic oxide carrier. The problem of sulfur contamination and regeneration in an environment of sulfur oxides is particularly important when the catalyst comprises a platinum group component and a rhenium component in association with a porous inorganic oxide. The rhenium which may be present in an amount of from 0.01 to 5 weight percent, and more preferably from 0.01 to 2 weight percent, while significantly improving the catalyst for many hydroconversion processes, particularly for reforming, also leads to a catalyst sensitive to sulfur.

The present regeneration process for removing carbonaceous matter from a platinum group component catalyst in a hydroconversion unit which has become contaminated with sulfur involves carefully controlling the temperatures in the several reactors and carefully controlling the oxygen content in the regeneration gas. Also the place of introduction of the oxygen into the reactor must be controlled.

The first step in the regeneration process involves purging the hydroconversion unit, namely, the plurality of reactors and the heating zones, etc., of any hydrocarbons which may be absorbed or adsorbed in the hydroconversion unit, particularly adsorbed on the catalyst. Purging the hydroconversion unit of hydrocarbons insures that the contact with oxygen-containing gas will not result in uncontrollable combustion. Thus, the formation of extreme temperatures and danger of damage to the catalyst is substantially eliminated. The purging of the hydroconversion unit of hydrocarbons can be accomplished by circulating an inert gas through the hydroconversion unit for a sufficient length of time until no hydrocarbons are evident in the exit stream from the terminal reactor. A suitable inert gas is nitrogen. However, argon or any of the other inert gases which will not react to form undesirable reaction products with the catalyst or with the iron walls the hydroconversion unit may be used.

Following purging of the hydroconversion unit of hydrocarbons, the circulation of inert gas throughout the hydroconversion unit is continued. The pressure of the inert gas, which is preferably nitrogen, is maintained within the range of from 50 to 1,000 p.s.i.g. and more preferably 50 to 500 p.s.i.g. The exact pressure will depend to some extent on the particular hydroconversion unit involved; for example, in a hydrocracking unit it may be desirable to maintain the pressure of circulating inert gas at a higher value than in the case of a reforming unit since the hydrocracking unit is normally operated at higher conversion pressures. As a preferred embodiment of the present invention, the inert gas is circulated through the hydroconversion unit at a pressure of from 100 to 200 p.s.i.g. When the hydroconversion unit is a reforming unit, it is particularly desired that the pressure be within this range, i.e., from 100 to 200 p.s.i.g.

While continuing the circulation of inert gas, the inlet temperatures in all the reactors, with the exception of the terminal reactor, is controlled at below 500° F. By "inlet temperature" is meant the temperature of the circulating gas just as it enters the reactor. When there is no regeneration occurring, i.e., no burning of carbon from the catalyst, the average catalyst temperature will be approximately the same as that of the inlet temperature. Also, the exit temperature of the reaction zone or reactor, i.e., the temperature of the circulating gas just as it leaves the reactor, will be about that of the inlet temperature when only inert gas is circulating through the hydroconversion unit. It is important that, when the terminal reactor is being regenerated, the inlet temperature of the other reactors be maintained at below about 500° F. This insures that, if any oxygen should be recirculated through the system and in contact with the heating zones and reactors other than the terminal reactor, the sulfur contaminating the unit will not be oxidized to sulfur oxides to any great extent. At temperatures above about 500° F., there may be significant oxidation of the sulfur to sulfur oxides if any oxygen should come in contact with the sulfur.

The terminal reactor temperature is adjusted such that the inlet temperature is in the range of from 500° to 700° F. and preferably from 550° to 700° F. The inlet temperature can be adjusted by controlling the heating zone, e.g., the furnace ahead of the terminal reactor.

When the circulating inert gas is at a pressure within the range from about 50 to 1000 p.s.i.g., or at a more preferred range, and when the inlet temperature of the reactors is at below about 500° F. with the exception of the terminal reactor, which should be at an inlet temperature of from 500° to 700° F., the oxygen-containing gas, e.g., air or pure oxygen, can be introduced into the terminal reactor in an amount such that the volume percent of oxygen to total circulating gas does not exceed about 2. Preferably the volume percent of oxygen to total circulating gas should not exceed about 1. It is important that the oxygen-containing gas be introduced into the inlet region of the terminal reactor; that is, the oxygen-containing gas should not be introduced ahead of the heating zone. By introducing the oxygen-containing gas into the inlet of the terminal reactor, the possibility of oxidizing sulfur compounds in the heating zone or in the piping from the heating zone to the terminal reactor is substantially eliminated. As a practical matter, it may be necessary to introduce the oxygen-containing gas into the feed line at some point ahead of the inlet to the terminal reactor but under no circumstances should the oxygen-containing gas be introduced ahead of the heating zone. While it is indicated that the oxygen-containing gas should be introduced in an amount such that the oxygen-containing gas should be introduced in an amount such that the volume percent of oxygen to total circulating gas in the reaction zone should not exceed about 2, and preferably not exceed about 1, sufficient oxygen should be introduced to remove carbonaceous matter from the catalyst. Inasmuch as only a very small amount of an oxygen-containing gas is introduced into the circulating inert gas stream to the terminal reactor, the inlet temperature will not vary substantially from the previous value before the oxygen-containing gas was introduced. At the temperature from 500° to 700° F., the the oxygen-containing gas will burn carbonaceous matter from the catalyst. Generally, a heat front will move down through the catalyst bed as the oxygen-containing gas is added to the inlet region. The amount of oxygen-containing gas should be carefully controlled so that no extreme uncontrollable temperature exotherm or heat wave occurs. The small amount of oxygen, i.e., less than about 2 volume percent based on the total circulating gas, will normally burn substantially all of the carbonaceous deposits from the catalyst at the particular temperature involved. Also, the removal of the carbonaceous matter will be accompanied by the restoration of activity to the catalyst.

During the introduction of the oxygen-containing gas into the terminal reactor, careful analysis of the gas exiting from the terminal reactor should be maintained. The means for analyzing the exiting gas are well known in the prior art. When the oxygen content in the exiting gas from the terminal reactor exceeds about 0.1 volume percent, the introduction of oxygen into the terminal reactor should be discontinued. Inasmuch as the oxygen is circulating with the inert gas, it will normally be recycled to the reactors ahead of the terminal reactor, e.g., the first or second reactor. The oxygen present, if in excess of about 0.1 volume percent, may oxide sulfur compounds in the first one or two reactors or in the heating zones, etc., ahead of the reactors, thereby resulting in the formation of sulfur oxides which contaminate the catalysts contained in each reactor. When the oxygen is less then about 0.1 volume percent, there is little likelihood of sulfur being oxidized to sulfur oxides, particularly at the low temperatures which exist in the reactors, etc., which are located ahead of the terminal reactor.

If it is desired to regenerate the catalyst in the first reactor or any other subsequent reactor ahead of the terminal reactor, this may be accomplished by reducing the inlet temperature in the terminal reactor and any other reactor which is not to be regenerated to below about 500° F. For the reactor containing catalyst to be regenerated, the inlet temperature should be adjusted to within the range of 500° to 700° F. Thereafter an oxygen-containing gas is introduced into the circulating inert gas at the inlet to the particular reactor-containing catalyst to be regenerated. Again, it is important that the oxygen-containing gas not be introduced ahead of the interheater but should be introduced preferably right at the inlet region to the terminal reactor. As soon as the oxygen content from the exit of the reactor is greater than about 0.1 volume percent, the introduction of air into the reactor should be terminated.

It is a preferred procedure that the terminal reactor be regenerated first by the process of the present invention. Thereafter, the reactor which is just ahead of the terminal reactor, i.e., the next-to-the-last reactor in the series of reactors, should be regenerated. Following regeneration of the next-to-the-last reactor, the reactor ahead of that reactor should be regenerated and so forth. It may not be necessary to regenerate all the reactors in a plurality of reactors in series inasmuch as some of the reactors do not become contaminated with carbonaceous matter to the same extent as other reactors. Thus, in a reforming unit, the terminal reactor becomes contaminated with carbonaceous matter earlier than the other reactors.

After the terminal reactor or any other reactors have been regenerated, the hydroconversion unit is purged of any oxygen, e.g., by continuing the flow of inert gas for a period of time, e.g., 0.5 hour. The inert gas flow is then discontinued and the hydroconversion unit pressured with hydrogen at an elevated temperature, e.g., above 500° F. Generally contact of the catalyst with hydrogen at an elevated temperature is continued for at least 0.5 hour. This prereduction is desirable prior to introduction of the feed to be hydroconverted.

While it is indicated that the regeneration procedure of the present invention is useful for any platinum group component catalyst used in a hydroconversion process, the present invention is particularly valuable for the regeneration of platinum-alumina catalyst or platinum-rhenium-alumina catalyst used in a reforming process. Thus, e.g., a reforming process which is conducted at a pressure of from 50 to 750 p.s.i.g., and preferably from 100 to 500 p.s.i.g., a liquid hourly space velocity of from 0.1 to 10 and a hydrogen to hydrocarbon mole ratio of from 0.5 to 20 will show a decline in the production of valuable $C_5+$ gasoline production after a prolonged period of operation. The deactivation of the catalyst is accompanied by the accumulation of carbonaceous deposits on the catalyst. Also when sulfur is present in the feed or when a large amount of sulfur has been inadvertently added to the reforming unit, the unit thus becomes contaminated with sulfur. It is thus necessary, in order to remove the carbonaceous deposits and activate the catalyst without damaging the catalyst by the formation of sulfur oxides, to follow the procedures of the present invention.

The foregoing disclosure of this invention is not to be considered as limiting since many variations can be made by those skilled in the art without departing from the scope or spirit of the appended claims.

I claim:

1. In a hydroconversion process for producing a product of improved quality comprising contacting a hydrocarbon feed at hydroconversion conditions and in the presence of hydrogen with a catalyst comprising a platinum group component associated with a porous inorganic oxide carrier in a hydroconversion unit comprising a plurality of reactors in series, each reactor being preceded by a heating zone, periodically regenerating the catalyst in at least one of the reactors when said catalyst has become deactivated and has carbonaceous matter accumulated thereon and when said hydroconversion unit has become contaminated with sulfur, gases from the regenerating being recirculated through a recycle line to at least one of the other reactors, the improved method for regenerating said catalyst in at least one of the reactors to remove carbonaceous matter without contaminating the catalyst with sulfur oxides, which comprises:
   1. purging said oxygen-containing unit of hydrocarbons;
   2. circulating an inert gas through said hydroconversion unit at a pressure of from 50 to 1000 p.s.i.g.;
   3. controlling the inlet temperature for the reactor containing catalyst to be regenerated at from 500° to 700° F. throughout the regenerating;
   4. controlling the inlet temperature in the other reactors at below about 500° F. throughout the regenerating;
   5. introducing an oxygen-containing gas only into the reactor-containing catalyst being regenerated in an amount such that the volume percent of oxygen to total circulating gas does not exceed about 2, but in sufficient amount to remove carbonaceous matter from the catalyst therein;
   6. discontinuing the introduction of said oxygen-containing gas into said reactor containing catalyst being regenerated when the oxygen content of the gas exiting from said reactor-containing catalyst being regenerated exceeds about 0.1 volume percent; and
   7. purging the hydroconversion unit of any oxygen and heating the catalyst in the reactors in the presence of hydrogen.

2. In a hydroconversion process for producing a product of improved quality comprising contacting a hydrocarbon feed at hydroconversion conditions in the presence of hydrogen with a catalyst comprising a platinum group component in association with a porous inorganic oxide carrier in a hydroconversion unit comprising a plurality of reactors in series, each reactor being preceded by a heating zone, periodically regenerating the catalyst in the terminal reactor when said catalyst in the terminal reactor has become deactivated and has carbonaceous matter accumulated thereon and when said hydroconversion unit has become contaminated with sulfur, gases from the regenerating being recirculated through a recycle line to at least one of the other reactors, the improved method for regenerating the catalyst in said terminal reactor to remove carbonaceous matter and to restore activity to said catalyst in said terminal reactor without contaminating the catalyst with sulfur oxides, which comprises:
   1. purging said hydroconversion unit of hydrocarbons;
   2. circulating an inert gas through said hydroconversion unit at a pressure of from 50 to 1000 p.s.i.g.;
   3. controlling the inlet temperature in all but the terminal reactor at below about 500° F. throughout the regenerating;
   4. controlling the inlet temperature in the terminal reactor at from 500° to 700° F. throughout the regenerating;
   5. introducing an oxygen-containing gas only into the terminal reactor in an amount such that the volume percent of oxygen to total circulating gas does not exceed about 2, but in sufficient amount to remove carbonaceous matter from said catalyst therein;
   6. discontinuing the introduction of said oxygen-containing gas into the terminal reactor when the oxygen content of the gas exiting from the terminal reactor exceeds about 0.1 volume percent; and
   7. purging the hydroconversion unit of any oxygen and heating the catalyst in the reactors in the presence of hydrogen.

3. In a reforming process for producing a product of improved quality comprising contacting a hydrocarbon feed at reforming conditions and in the presence of hydrogen with a catalyst comprising a platinum group component associated with a porous inorganic oxide carrier in a reforming unit comprising a plurality of reactors in series, each reactor being preceded by a heating zone to heat the hydrocarbon feed to desired reforming temperature, periodically regenerating the catalyst in the terminal reactor when said catalyst in said terminal reactor has become deactivated and has carbonaceous matter accumulated thereon and when said reforming unit has become contaminated with sulfur, gases from the regenerating being recirculated through a recycle line to at least one of the other reactors, the improved method for regenerating said catalyst in said terminal reactor to remove carbonaceous matter without contaminating said catalyst in said terminal reactor with sulfur oxides, which comprises:
   1. purging the reforming unit of hydrocarbon;
   2. circulating an inert gas through the reforming unit at a pressure from 50 to 500 p.s.i.g.;
   3. controlling the inlet temperature in all but the terminal reactor below about 500° F. throughout the regenerating;
   4. controlling the inlet temperature in the terminal reactor at from 500° to 700° F. throughout the regenerating;
   5. introducing an oxygen-contining gas only into the terminal reactor in an amount such that the volume percent of oxygen to total circulating gas does not exceed about 2, but in sufficient amount to remove carbonaceous matter from said catalyst therein;
   6. discontinuing the introducing of said oxygen-containing gas into the terminal reactor when the oxygen content of the gas exiting from the terminal reactor exceeds about 0.1 volume percent; and
   7. purging the reforming unit of any oxygen and heating the catalyst in the reactors in the presence of hydrogen.

4. The process of claim 1 wherein said platinum group component is platinum.

5. The process of claim 1 wherein said volume percent of oxygen to total circulating gas does not exceed about 1.

6. The process of claim 3 wherein said inert gas is at a pressure of from 100 to 200 p.s.i.g.

7. The process of claim 3 wherein said platinum group component is present in an amount of from 0.01 to 3 weight percent.

8. The process of claim 7 wherein said catalyst comprises platinum in an amount of from 0.01 to 3 weight percent associated with alumina.

9. The process of claim 8 wherein said catalyst also comprises rhenium in an amount of from 0.01 to 5 weight percent.

* * * * *